(12) United States Patent
Kwon

(10) Patent No.: US 8,863,210 B2
(45) Date of Patent: Oct. 14, 2014

(54) CABLE BROADCAST PROGRAM RECEIVER AND A DIAGNOSTIC METHOD OF THE CABLE BROADCAST PROGRAM RECEIVER

(71) Applicant: LG Electronics Inc., Seoul (KR)

(72) Inventor: Kwanghun Kwon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/650,518

(22) Filed: Oct. 12, 2012

(65) Prior Publication Data

US 2013/0283327 A1    Oct. 24, 2013

Related U.S. Application Data

(60) Provisional application No. 61/549,754, filed on Oct. 21, 2011.

(51) Int. Cl.
*H04N 7/173* (2011.01)
*H04N 21/4363* (2011.01)
*H04N 21/442* (2011.01)
*H04N 21/418* (2011.01)

(52) U.S. Cl.
CPC ..... *H04N 21/4424* (2013.01); *H04N 21/43632* (2013.01); *H04N 21/44227* (2013.01); *H04N 21/418* (2013.01)
USPC .......................................... 725/107; 725/153

(58) Field of Classification Search
CPC .................................................... H04N 17/045
USPC .................................................... 725/107, 72
See application file for complete search history.

(56) References Cited

U.S. PATENT DOCUMENTS

2008/0133782 A1    6/2008    Kwon
2010/0142723 A1*   6/2010    Bucklen .......................... 381/81

FOREIGN PATENT DOCUMENTS

| CN | 101232587 | 7/2008 |
| EP | 1624669 | 2/2006 |
| EP | 1784017 | 5/2007 |
| WO | 2009-120682 | 10/2009 |

OTHER PUBLICATIONS

CableLabs OpenCable Specifications—CableCard Interface 2.0 Specification, OC-SP-CCIF2.0-I07-060803, published Aug. 3, 2006, pp. 153-173.*
Ltd Hitachi: "High-Definition Multimedia Interface Specification Version 1.3a", Nov. 10, 2006, XP055113810.

* cited by examiner

*Primary Examiner* — Benjamin R Bruckart
*Assistant Examiner* — Michael M Nguyen
(74) *Attorney, Agent, or Firm* — McKenna Long & Aldridge LLP

(57) ABSTRACT

The present invention relates to a cable broadcast program receiver and a diagnostic method of the cable broadcast program receiver. In an aspect of the present invention, a diagnostic method of a cable broadcast program receiver may include transmitting, at a cablecard, a diagnostic request containing diagnostic information regarding DiiVA connection status to a host according to a protocol of an interface between the cablecard and the host; and receiving, at the host, the diagnostic request and transmitting diagnostic confirmation information containing a diagnostic status report regarding the DiiVA connection status to the cablecard according to the protocol of the interface between the cablecard and the host in response to the diagnostic request.

14 Claims, 8 Drawing Sheets

FIG. 2

| Diagnostic | Value |
|---|---|
| Host memory allocation | 0x00 |
| Application version number | 0x01 |
| Firmware version | 0x02 |
| MAC address | 0x03 |
| FAT status | 0x04 |
| FDC status | 0x05 |
| Current Channel Report | 0x06 |
| 1394 Port | 0x07 |
| DVI status | 0x08 |
| eCM | 0x09 |
| HDMI Port Status | 0x0A |
| RDC status | 0x0B |
| OCHD2 Network Address | 0x0C |
| Home Networking Status | 0x0D |
| Host Information | 0x0E |
| DiiVA Status | 0x0F |
| Reserved | 0x10-0xFF |

FIG. 3

| Syntax | No. of Bits | Mnemonic |
|---|---|---|
| diagnostic_cnf() { | | |
|   diagnostic_cnf_tag | 24 | uimsbf |
|   length_field() | | |
|   number_of_diag | 8 | uimsbf |
|   for (i=0; i<number_of_diag; i++) { | | |
|     diagnostic_id | 8 | uimsbf |
|     status_field | 8 | uimsbf |
|     if (status_field == 0x00) { | | |
|       if (diagnostic_id == 0x00) { | | |
|         memory_report() | | |
|       } | | |
|       if (diagnostic_id == 0x01) { | | |
|         software_ver_report() | | |
|       } | | |
|       if (diagnostic_id == 0x02) { | | |
|         firmware_ver_report() | | |
|       } | | |
|       if (diagnostic_id == 0x03) { | | |
|         MAC_address_report() | | |
|       } | | |
|       if (diagnostic_id == 0x04) { | | |
|         FAT_status_report() | | |
|       } | | |
|       if (diagnostic_id == 0x05) { | | |
|         FDC_status_report() | | |
|       } | | |
|       if (diagnostic_id == 0x06) { | | |
|         current_channel_report() | | |
|       } | | |
|       if (diagnostic_id == 0x07) { | | |
|         1394_port_report() | | |
|       } | | |
|       if (diagnostic_id == 0x08) { | | |
|         DVI_status_report() | | |
|       } | | |
|       if (diagnostic_id == 0x09) { | | |
|         eCM_status_report() | | |
|       } | | |
|       if (diagnostic_id == 0x0A) { | | |
|         HDMI_port_status_report() | | |
|       } | | |
|       if (diagnostic_id == 0x0B) { | | |
|         RDC_status_report() | | |
|       } | | |
|       if (diagnostic_id == 0x0C) { | | |
|         net_address_report() | | |
|       } | | |
|       if (diagnostic_id == 0x0D) { | | |
|         home_network_report() | | |
|       } | | |
|       if (diagnostic_id == 0x0E) { | | |
|         host_information_report() | | |
|       } | | |
|       if(diagnostic_id == 0x0F) { | | |
|         DiiVA_status_report() | | |
|       } | | |
|     } | | |
|   } | | |
| } | | |

FIG. 4

| Syntax | No. of Bits | Mnemonic |
|---|---|---|
| diagnostic_cnf() { | | |
|   diagnostic_cnf_tag | 24 | uimsbf |
|   length_field() | | |
|   number_of_diag | 8 | uimsbf |
|   for (i=0; i<number_of_diag; i++) { | | |
|     diagnostic_id | 8 | uimsbf |
|     ltsid | 8 | uimsbf |
|     status_field | 8 | uimsbf |
|     if (status_field == 0x00) { | | |
|       if (diagnostic_id == 0x00) { | | |
|         memory_report() | | |
|       } | | |
|       if (diagnostic_id == 0x01) { | | |
|         software_ver_report() | | |
|       } | | |
|       if (diagnostic_id == 0x02) { | | |
|         firmware_ver_report() | | |
|       } | | |
|       if (diagnostic_id == 0x03) { | | |
|         MAC_address_report() | | |
|       } | | |
|       if (diagnostic_id == 0x04) { | | |
|         FAT_status_report() | | |
|       } | | |
|       if (diagnostic_id == 0x05) { | | |
|         FDC_status_report() | | |
|       } | | |
|       if (diagnostic_id == 0x06) { | | |
|         current_channel_report() | | |
|       } | | |
|       if (diagnostic_id == 0x07) { | | |
|         1394_port_report() | | |
|       } | | |
|       if (diagnostic_id == 0x08) { | | |
|         DVI_status_report() | | |
|       } | | |
|       if (diagnostic_id == 0x09) { | | |
|         eCM_status_report() | | |
|       } | | |
|       if (diagnostic_id == 0x0A) { | | |
|         HDMI_port_status_report() | | |
|       } | | |
|       if (diagnostic_id == 0x0B) { | | |
|         RDC_status_report() | | |
|       } | | |
|       if (diagnostic_id == 0x0C) { | | |
|         net_address_report() | | |
|       } | | |
|       if (diagnostic_id == 0x0D) { | | |
|         home_network_report() | | |
|       } | | |
|       if (diagnostic_id == 0x0E) { | | |
|         host_information_report() | | |
|       } | | |
|       if (diagnostic_id == 0x0F) { | | |
|         DiiVA_status_report() | | |
|       } | | |
|     } | | |
|   } | | |
| } | | |

FIG. 5

| Syntax | No. of Bits | Mnemonic |
|---|---|---|
| DiiVA_status_report() { | | |
|     device_type | 2 | bslbf |
|     device_version | 16 | bslbf |
|     connection_status | 2 | bslbf |
|     host_HDCP_status | 1 | bslbf |
|     device_HDCP_status | 2 | bslbf |
|     reserved | 1 | |
|     video_format { | | |
|         horizontal_lines | 16 | uimsbf |
|         vertical_lines | 16 | uimsbf |
|         frame_rate | 8 | uimsbf |
|         aspect_ratio | 2 | bslbf |
|         prog_inter_type | 1 | bslbf |
|         color_depth | 3 | bslbf |
|         reserved | 2 | |
|     } | | |
|     audio_format { | | |
|         audio_sample_size | 2 | bslbf |
|         audio_format | 3 | bslbf |
|         audio_sample_freq | 3 | bslbf |
|     } | | |
| } | | |

FIG. 6

| Frame Rate Code | Frame Rate |
|---|---|
| 01 | 23.976 Hz |
| 02 | 24 Hz |
| 04 | 29.97 Hz |
| 05 | 30 Hz |
| 07 | 59.94 Hz |
| 08 | 60 Hz |

FIG. 7

| Bit Value | Video Format |
|---|---|
| 00 | 4:3 |
| 01 | 16:9 |
| 10 | Reserved |
| 11 | Reserved |

CABLE BROADCAST PROGRAM RECEIVER AND A DIAGNOSTIC METHOD OF THE CABLE BROADCAST PROGRAM RECEIVER

This application claims the benefit of U.S. Provisional Application No. 61/549,754, filed on Oct. 21, 2011, which is hereby incorporated by reference.

BACKGROUND OF THE INVENTION

1. Field of the Invention

The present invention relates to a cable broadcast program receiver and a diagnostic method of the cable broadcast program receiver.

2. Discussion of the Related Art

A high-speed interface standard used in audio/video devices, i.e. a digital interactive interface for video & audio (DiiVA), has a network function operating at high speed and a level equivalent to Ethernet. DiiVA is a next-generation display interface that is capable of freely achieving connection among a personal computer (PC), a digital TV, and all display devices (Blulay Player, Set-top box, etc.) using one of the latest connectors. DiiVA may completely substitute the existing standard to achieve connection between a TV and a digital device in a high definition multimedia interface (HDMI) mode. Also, DiiVA is a new technology to achieve connection among all display devices, such as a high definition TV (HDTV), using one connector to support reproduction of HD contents and construction of a network. DiiVA is compatible with HDMI, which is currently used. In the related industry, a digital input/output interface adopted in a digital TV (DTV) set and a set-top box is gradually converted to DiiVA. In a case in which a conventional cable broadcast program receiver has a DiiVA interface, however, a method of diagnosing the DiiVA interface of the cable broadcast program receiver is not provided. Although the DiiVA interface has trouble, therefore, it is not possible for a user or a head-end to find or solve the trouble of the DiiVA interface.

SUMMARY OF THE INVENTION

Accordingly, the present invention is directed to a cable broadcast program receiver and a diagnostic method of a cable broadcast program receiver that substantially obviates one or more problems due to limitations and disadvantages of the related art.

An object of the present invention is to provide a cable broadcast program receiver and a diagnostic method of the cable broadcast program receiver that is capable of, when the cable broadcast program receiver has a digital interactive interface for video & audio (DiiVA interface), diagnosing the DiiVA interface.

Another object of the present invention is to provide a cable broadcast program receiver and a diagnostic method of the cable broadcast program receiver that enables a user of the cable broadcast program receiver to directly diagnose status of the DiiVA interface of the cable broadcast program receiver or that enables a head-end to remotely diagnose status of the DiiVA interface of the cable broadcast program receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a cable broadcast program receiver may comprise a cablecard configured to transmit a diagnostic request containing diagnostic information regarding digital interactive interface for video & audio (DiiVA) connection status to a host according to a protocol of an interface between the cablecard and the host, and the host configured to receive the diagnostic request, and to transmit diagnostic confirmation information containing a diagnostic status report regarding the DiiVA connection status to the cablecard according to the protocol of the interface between the cablecard and the host in response to the diagnostic request.

The diagnostic confirmation information may includes a diagnostic identifier regarding the DiiVA connection status. The diagnostic status report regarding the DiiVA connection status may include information indicating whether a device connected to the host uses a digital visual interface (DVI), high definition multimedia interface (HDMI), or DiiVA.

The diagnostic status report regarding the DiiVA connection status contains information indicating a DiiVA device connected to the host.

The diagnostic status report regarding the DiiVA connection status may include information indicating whether High-bandwidth Digital Content Protection (HDCP) is enabled on a DiiVA link.

The diagnostic status report regarding the DiiVA connection status may include information indicating HDCP status of a device connected to the host.

The diagnostic status report regarding the DiiVA connection status contains information indicating a current audio format utilized on a DiiVA link In another aspect of the present invention, a diagnostic method of a cable broadcast program receiver may include transmitting, at a cablecard, a diagnostic request containing diagnostic information regarding DiiVA connection status to a host according to a protocol of an interface between the cablecard and the host; and receiving, at the host, the diagnostic request and transmitting diagnostic confirmation information containing a diagnostic status report regarding the DiiVA connection status to the cablecard according to the protocol of the interface between the cablecard and the host in response to the diagnostic request.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a view showing an example in which host system information that a cablecard can receive from a host is defined as diagnostic identification (ID);

FIG. 3 is a view showing an example of Diagnostic Confirm Object syntax in which the host reports diagnostic status information regarding a digital interactive interface for video & audio (DiiVA interface) to the cablecard in a single mode according to an embodiment of the present invention;

FIG. 4 is a view showing an example of Diagnostic Confirm Object syntax in which the host reports diagnostic status information regarding the DiiVA interface to the cablecard in a multi mode according to an embodiment of the present invention;

FIG. 5 is a view showing an example of DiiVa_status_report( ) illustrated in FIGS. 3 and 4 according to the embodiment of the present invention;

FIG. 6 is a view illustrating values of a frame_rate field;

FIG. 7 is a view illustrating values of an aspect_ratio field;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A cable broadcast system broadly includes a cable broadcast station or cable TV station) and a cable broadcast program receiver (or digital cable TV receiver). Herein, the cable broadcast station is a transmitting and receiving end transmitting cable broadcast programs, and the cable broadcast program receiver receives the transmitted cable broadcast program. The cable broadcast station may be referred to an SO head-end or an MSO head-end. The SO refers to a System. Operator (SO), which is a Korean Cable System Operator (i.e., the Local Cable TV System Operator), and the MSO refers to a Multiple System Operator (MSO), which is a group of system operators.

Moreover, the cable broadcast program receiver adopts an open cable, wherein a cablecard (or card) including a Conditional Access (CA) system is separated (or detached) from the main body. For example, the cablecard uses a Personal Computer Memory Card International Association (PCMCIA) card which can be mounted onto and separated from a main body slot of the cable broadcast program receiver. The main body, wherein the cablecard is inserted, may also be referred to as a host. For example, a Digital Built-in TV or a Digital Ready TV corresponds to the host, and a combination of the host and the cablecard is referred to as the cable broadcast program receiver.

Various peripheral devices (for example, a digital TV, a digital versatile disc (DVD) player, a digital camcorder, a set-top box, etc.) may be connected to the host via a digital visual interface (DVI interface), a high definition multimedia interface (HDMI interface), or a digital interactive interface for video & audio (DiiVA interface). That is, the host may include at least one DVI, HDMI, or DiiVA interface. In this case, a plurality of peripheral devices may be connected to the host via the DVI interface, the HDMI interface, or the DiiVA interface.

The cablecard is separated from the main body, a diagnostic function is provided to allow each status of the host to be monitored.

For example, in the STCE 28 2004 standard, the Generic Diagnostic Protocol is defined in a host-cablecard interface resource layer.

The Generic Diagnostic Protocol has been defined to enable each status information of the host to be monitored in real-time through local broadcast stations (local, user) or cable broadcast stations (remote, MSO head-end).

Figure 1:
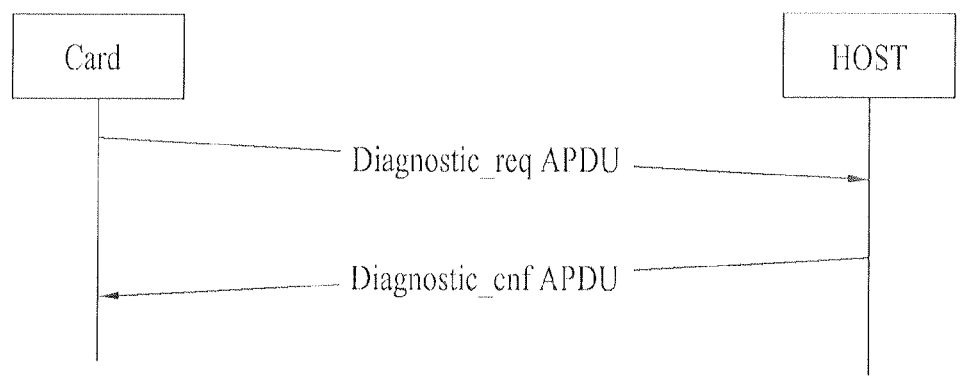
FIG. 1 is a view illustrating a Generic Diagnostic Protocol according to the present invention.

FIG. 1 illustrates an operating principle of a Generic Diagnostic Protocol according to the present invention in which a cablecard transmits a diagnostic request Diagnostic_req APDU to a host, and the host transmits a diagnostic result Diagnostic_cnf APDU to the cablecard.

Upon receiving a diagnostic command from a user or a head-end, the cablecard transmits a diagnostic request Diagnostic_req APDU to the host. A cable broadcast station may transmit the diagnostic request to the cablecard, or a user may directly input the diagnostic request into the cablecard using a remote controller. Otherwise, the host may periodically confirm a system status and may transmit the result to the cablecard even when there is no diagnostic request from the cablecard.

For example, on the assumption that a cable broadcast program is not normally played, if a diagnostic request item that can be selected by a user is present in the remote controller or a menu screen, the user may directly select a diagnostic request from the remote controller or the menu screen. Under a condition in which the user cannot directly select the diagnostic request, the user may inquire of a cable broadcast station through telephony or the Internet, and the cable broadcast station may transmit a diagnostic request to the cablecard of a corresponding cable broadcast program receiver.

Meanwhile, the host, receiving the diagnostic request Diagnostic_req APDU from the cablecard, confirms the status of diagnostic items corresponding to Diagnostic identification (ID) and reports the result Diagnostic_cnf APDU to the cablecard.

The cablecard may transmit the diagnostic result Diagnostic_cnf APDU, received from the host, to the cable broadcast station or may show the user through an on-screen display (OSD) diagnostic application.

For example, if bidirectional transmission is possible between the cable broadcast station and the cable broadcast program receiver, the diagnostic result is transmitted to the cable broadcast station through out-of-band (OOB). At this time, the diagnostic result may be transmitted to the cable broadcast station and, at the same time, may be displayed on a TV screen through the OSD Diagnostic application.

If the cable broadcast program receiver is a unidirectional receiver, the diagnostic result is displayed on the TV screen through the OSD Diagnostic application. When the user informs the cable broadcast station of display contents, the cable broadcast station performs an operation (for example, request of an after-sales service through wired or wireless communication or direct visit) based on the diagnostic result.

FIG. 2 shows an example in which host system information that the cablecard can receive from the host is defined as diagnostic ID. When the cablecard recognizes the status of corresponding information as the diagnostic ID and transmits a diagnostic request to the host as illustrated, the host confirms the status of diagnostic items and transmits the result, i.e. a report, to the cablecard.

For example, diagnostic ID 0x00 is recognized as diagnostic information regarding host memory allocation, one of the diagnostic items contained in the report, which is the diagnostic request and the diagnostic result, diagnostic ID 0x01 is recognized as diagnostic information regarding application version number, and diagnostic ID 0x02 is recognized as diagnostic information regarding firmware version.

The cable broadcast program receiver or the diagnostic method according to the embodiment of the present invention may be recognized by diagnostic ID 0x0F of the DiiVA interface included in the cable broadcast program receiver. A value of the diagnostic ID is an example, another diagnostic ID value of the DiiVA interface may be provided.

When the cablecard according to the embodiment of the present invention transmits a diagnostic request containing the diagnostic ID 0x0F to the host, therefore, the host may perform diagnostics with respect to the DiiVA interface and may transmit a report containing the diagnostic result to the cablecard. Consequently, the user or the head-end may determine whether the DiiVA interface has trouble based on the diagnostic result with respect to the DiiVA interface contained in the report.

FIG. 3 shows an example of Diagnostic Confirm Object syntax in which the host reports diagnostic status information regarding the DiiVA interface to the cablecard in a single mode according to an embodiment of the present invention.

In this embodiment, Diagnostic Confirm Object may include diagnostic_cnf_tag, length_field( ), number_of_diag, diagnostic_id, and status_field.

In a case in which the diagnostic ID is 0x0F, report(DiiVA_status_report( )) containing the diagnostic status information regarding the DiiVA interface may be included.

FIG. 4 shows an example of Diagnostic Confirm Object syntax in which the host reports diagnostic status information regarding the DiiVA interface to the cablecard in a multi mode according to an embodiment of the present invention.

In this embodiment, Diagnostic Confirm Object may include diagnostic_cnf_tag, length_field( ), number_of_diag, diagnostic_id, and status_field. Since a stream is multiplexed in the multi mode, an Itsid field corresponding to an identifier of the stream may be further included.

In a case in which the diagnostic ID is 0x0F, report(DiiVA_status_report( )) containing the diagnostic status information regarding the DiiVA interface may be included.

FIG. 5 shows an example of DiiVa_status_report( ) illustrated in FIGS. 3 and 4 according to the embodiment of the present invention.

When the cablecard transmits a DiiVA Status request to the host, the host may transmit the DiiVA Status request as illustrated to the cablecard according to a protocol defined between the cablecard and the host if no error occurs at the host. Here, if the host has a DiiVA connector, the host transmits the DiiVA Status request to the cablecard although a DVI or HDMI device is connected via the DiiVA connector. On the other hand, if the host has no DiiVA connector, the host does not reply to the DiiVA Status request although a DiiVA device is connected via a DVI or HDMI connector.

The illustrated DiiVA Status request may include the following fields.

Device_type field indicates whether the device is a DVI or HDMI or DiiVA.

The device_type field has the following values.
00b Device connected through DiiVA connector uses DVI
01b Device connected through DiiVA connector uses HDMI
10b Device connected through DiiVA connector uses DiiVA
11b Reserved In a case in which the value of the device_type field is 00, it indicates that a device connected through a DiiVA connector uses a DVI.

In a case in which the value of the device_type field is 01, it indicates that a device connected through a DiiVA connector uses an HDMI.

In a case in which the value of the device_type field is 10, it indicates that a device connected through a DiiVA connector uses a DiiVA.

Device_version field indicates the DiiVA device version.
The device_version field has the following values.
0x10 DiiVA 1.0
0x11 DiiVA 1.1
0x12 DiiVA 1.2
0x13 DiiVA 1.3
0x14-0xFF Reserved In a case in which the value of the device_version field is 0x10, it indicates that the DiiVA device version is 1.0. In a case in which the value of the device_version field is 0x11, it indicates that the DiiVA device version is 1.1. In a case in which the value of the device_version field is 0x12, it indicates that the DiiVA device version is 1.2. In a case in which the value of the device_version field is 0x13, it indicates that the DiiVA device version is 1.3.

Connection_status field indicates if a connection exists on the DiiVA port.

The connection_status field has the following values.
00b No connection exists
01b Device connected, no repeater or switch
10b Device connected, with repeater or switch
11b Reserved In a case in which the value of the connection_status field is 00, it indicates that no connection exists on the DiiVA port.

In a case in which the value of the connection_status field is 01, it indicates that there is a device connected to the DiiVA port without a repeater or switch.

In a case in which the value of the connection_status field is 10, it indicates that the device connected to the DiiVA port is connected via a repeater or switch.

Host_HDCP_status field indicates if High-bandwidth Digital Content Protection (HDCP) is enabled on the DiiVA link.

The host_HDCP_status field has the following values.
0b Not enabled
1b Enabled

In a case in which the value of the host_HDCP_status field is 0, it indicates that HDCP is not enabled on the DiiVA link. In a case in which the value of the host_HDCP_status field is 1, it indicates that HDCP is enabled on the DiiVA link.

Device_HDCP_status field indicates the connected device's HDCP status. This field is effective only in a case in which the value of the connection_status field is not 00.

The device_HDCP_status field has the following values.
00b Non HDCP device
01b Compliant HDCP device
10b Revoked HDCP device
11b Reserved In a case in which the value of the device_HDCP_status field is 00, it indicates that the device is not a HDCP device. In a case in which the value of the device_HDCP_status field is 01, it indicates that the device is a Compliant HDCP device. In a case in which the value of the device_HDCP_status field is 10, it indicates that the device is a Revoked HDCP device.

The Reserved field indicates an undesignated field.

Video_format field indicates the current video format utilized on the DiiVA link as defined in the following fields.

Horizontal_lines field indicates the number of horizontal lines associated with the video format on the DiiVA link.

Vertical_lines field indicates the number of vertical lines associated with the video format on the DiiVA link.

Frame_rate field indicates the frame rate associated with the video format on the DiiVA link. Examples of values of the frame_rate field are illustrated in FIG. 6.

Aspect_ratio field indicates the aspect ratio associated with the video format on the DiiVA link. Examples of values of the frame_rate field are illustrated in FIG. 7.

Prog_inter_type field indicates if the video is progressive or interlaced on the DiiVA link.

The prog_inter_type field has the following values.
0b Interlaced
1b Progressive In a case in which the value of the prog_inter_type field is 0, it indicates that the video is interlaced. In a case in which the value of the prog_inter_type field is 1, it indicates that the video is progressive.

Color_depth field indicates the color depth on the DiiVA link. The color_depth field has the following values.
0xxb Reserved
100b 24 bits per pixel
101b 30 bits per pixel
110b 36 bits per pixel
111b Reserved In a case in which the value of the color_depth field is 0xx, it indicates that the color depth has a reserved value. In a case in which the value of the color_depth field is 100, it indicates that the color depth has 24 bits per pixel. In a case in which the value of the color_depth field is 101, it indicates that the color depth has 30 bits per pixel. In a case in which the value of the color_depth field is 110, it indicates that the color depth has 36 bits per pixel.

Audio_sample_size field indicates the audio sample size on the DiiVA link. The audio_sample_size field has the following values.
01b 16
10b 20
11b 24

In a case in which the value of the audio_sample_size field is 01, it indicates that the audio sample size is 16. In a case in which the value of the audio_sample_size field is 10, it indicates that the audio sample size is 20. In a case in which the value of the audio_sample_size field is 11, it indicates that the audio sample size is 24.

Audio_format field indicates the audio format on the DiiVA link. The audio_format field has the following values.
00b PCM
001b MPEG-1
010b MPEG-2
011b DTS
100b AAC
101b MP3
110b ATRAC
111b Other audio format In a case in which the value of the audio_format field is 000, it indicates that the audio format is PCM. In a case in which the value of the audio_format field is 001, it indicates that the audio format is MPEG-1. In a case in which the value of the audio_format field is 010, it indicates that the audio format is MPEG-2. In a case in which the value of the audio_format field is 011, it indicates that the audio format is DTS. In a case in which the value of the audio_format field is 100, it indicates that the audio format is AAC. In a case in which the value of the audio_format field is 101, it indicates that the audio format is MP3. In a case in which the value of the audio_format field is 110, it indicates that the audio format is ATRAC.

Audio_sample_freq field indicates the audio sample frequency on the DiiVA link. The audio_sample_freq field has the following values.
000b 32.1 KHz
001b 44.1 KHz
010b 48.0 KHz
011b 88.2 KHz
100b 96.0 KHz
101b 176.4 KHz
110b 192 KHz
111b Other sample frequency In a case in which the value of the audio_sample_freq field is 000, it indicates that the audio sample frequency is 32.1 KHz. In a case in which the value of the audio_sample_freq field is 001, it indicates that the audio sample frequency is 44.1 KHz. In a case in which the value of the audio_sample_freq field is 010, it indicates that the audio sample frequency is 48.0 KHz. In a case in which the value of the audio_sample_freq field is 011, it indicates that the audio sample frequency is 88.2 KHz. In a case in which the value of the audio_sample_freq field is 100, it indicates that the audio sample frequency is 96.0 KHz. In a case in which the value of the audio_sample_freq field is 101, it indicates that the audio sample frequency is 176.4 KHz. In a case in which the value of the audio_sample_freq field is 110, it indicates that the audio sample frequency is 192 KHz.

FIG. 6 is a view illustrating values of the frame_rate field.

The frame_rate field indicates the frame rate associated with the video format on the DiiVA link. The frame_rate field may be recognized as a frame rate code of FIG. 6. In a case in which the frame rate code is 01, it indicates that the frame rate is 23.976 Hz. In a case in which the frame rate code is 02, it indicates that the frame rate is 24 Hz. In a case in which the frame rate code is 04, it indicates that the frame rate is 29.97 Hz. In a case in which the frame rate code is 05, it indicates that the frame rate is 30 Hz. In a case in which the frame rate code is 07, it indicates that the frame rate is 59.94 Hz. In a case in which the frame rate code is 08, it indicates that the frame rate is 60 Hz.

FIG. 7 is a view illustrating values of the aspect_ratio field. As previously described, the aspect_ratio field indicates the aspect ratio associated with the video format on the DiiVA link.

This example illustrates that the video format is 4:3 if the value of the aspect_ratio field is 00, and the video format is 16:9 if the value of the aspect_ratio field is 01.

Figure 8:
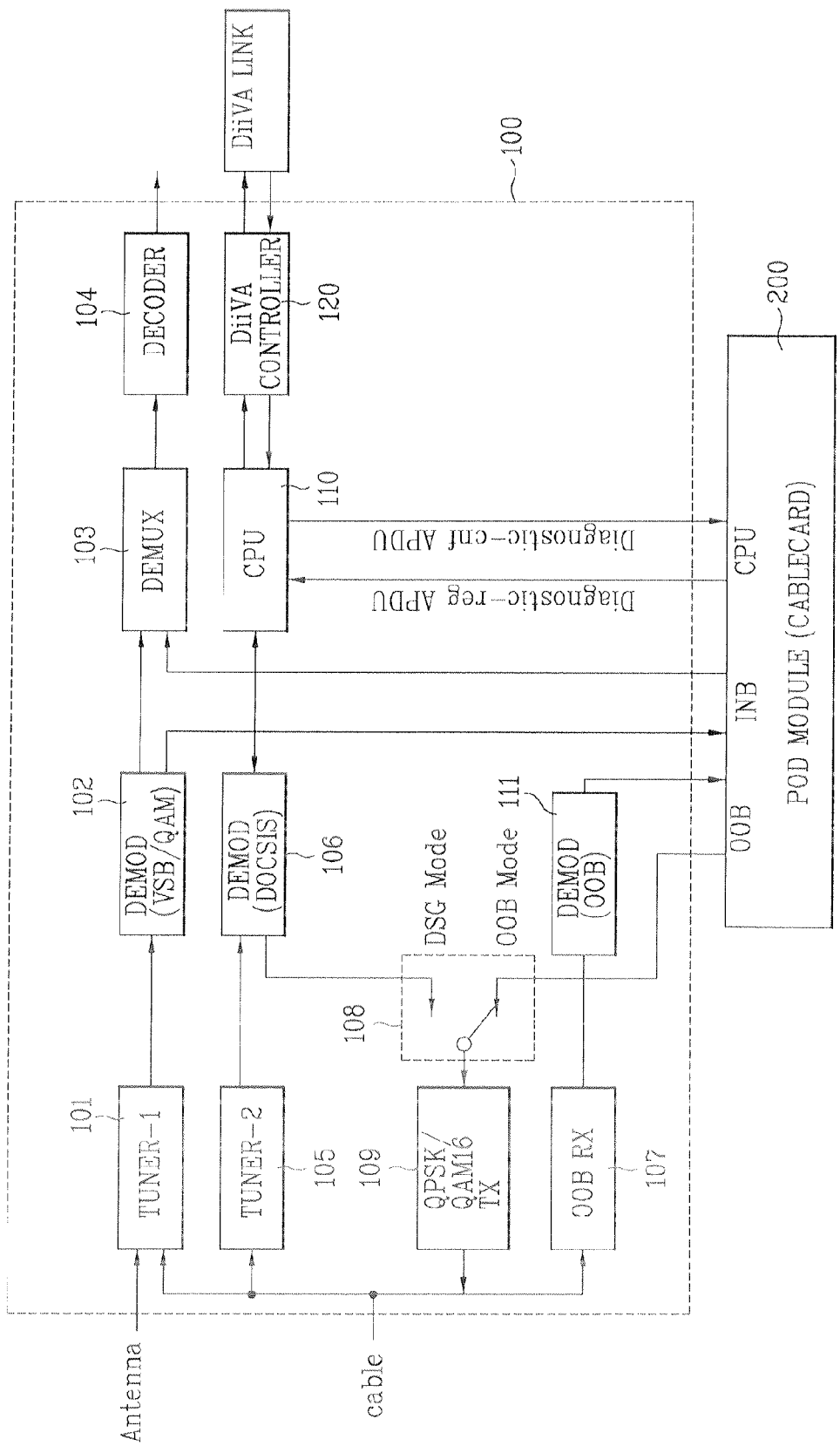
FIG. 8 is a view showing an example of a cable broadcast program receiver according to an embodiment of the present invention.

FIG. 8 is a view showing an example of a cable broadcast program receiver according to an embodiment of the present invention. The cable broadcast program receiver according to the embodiment of the present invention includes a host 100 and a cablecard 200 configured to be mounted into and separated from a slot of the host 100.

The host 100 may exclusively receive only cable broadcast programs or may receive both cable broadcast programs and terrestrial broadcast programs or even satellite broadcast programs. An example of FIG. 8 illustrates a cable digital TV that is capable of receiving both cable broadcast programs and terrestrial broadcast programs. Data broadcast programs, such as stock information or weather, are transmitted in two modes. Especially, an upstream service in an open cable is performed in an Out of Band (OOB) mode or a DOCSIS Settop Gateway (DSG) mode. Data broadcast programs are configured so that a viewer can select and watch a desired program when the viewer watch a TV, can directly participate in a broadcast program, or can select and watch necessary information. In addition, a combination of the ODD mode and the DSG mode may be provided.

The OOB mode is a mode in which transmission standard between a cable broadcast station (head-end) and an INTER-SEC device in a settop box is prescribed. DSG is a transmission mode between a cable modem control system of the cable broadcast station and a DOCSIS-based cable modem in the settop box. DOCSIS is a digital cable TV standard adopted by CableLabs, which is an American cable broadcast standard certification authority, i.e. a standard for data transmission using a cable modem.

FIG. 8 shows an embodiment of a cable broadcast program receiver adopting a combination of the ODD mode and the DSG mode, which, however, is merely an example. A cable broadcast program receiver adopting only the ODD mode or a cable broadcast program receiver adopting only the DSG mode may be used.

A first tuner 101 of the host 100 tunes only to a specific channel frequency of a terrestrial audio/video (A/V) broadcast program transmitted through an antenna or a cable A/B broadcast program transmitted in in-band through a cable and outputs the tuned specific channel frequency to a first demodulation unit 102.

The terrestrial broadcast program and the cable broadcast program are different from each other in terms of a transmission mode, and therefore, the terrestrial broadcast program and the cable broadcast program are different from each other in terms of a demodulation mode. That is, the terrestrial A/V broadcast program may be demodulated in a Vestigial Sideband Modulation (VSB) mode and then transmitted. On the other hand, the cable A/V broadcast program may be demodulated in a Quadrature Amplitude Modulation (QAM) mode and then transmitted. If the channel frequency tuned by the first tuner 101 is the terrestrial broadcast program, therefore, the channel frequency is demodulated by the first demodulation unit 102 in the VSB mode. If the channel frequency tuned to by the first tuner 101 is the cable broadcast program, on the other hand, the channel frequency is demodulated by the first demodulation unit 102 in the QAM mode.

Also, if the signal demodulated by the first demodulation unit 102 is the terrestrial broadcast program, the modulated signal is output to a demultiplexing unit 103. On the other hand, if the signal demodulated by the first demodulation unit 102 is the cable broadcast program, the modulated signal is output to the demultiplexing unit 103 through the cablecard 200 mounted in the slot. The cablecard 200 includes a Conditional Access (CA) system to prevent copying of high value-added broadcast contents and to allow conditional access to the high value-added broadcast contents. The cablecard 200 may also be referred to as a POD module.

That is, if the cable A/V broadcast program is scrambled, the cablecard 200 descrambles the cable A/V broadcast program and outputs the descrambled cable A/V broadcast program to the demultiplexing unit 103. If the cablecard 200 is not mounted in the slot, the cable A/V broadcast program demodulated by the first demodulation unit 102 is directly output to the demultiplexing unit 103. In this case, the scrambled cable A/V broadcast program cannot be descrambled with the result that the cable A/V broadcast program cannot be normally watched.

The demultiplexing unit 103 separates the multiplexed A/V broadcast program into a video signal and an audio signal, and outputs the video signal and the audio signal to a decoder 104. The decoder 104 decodes the compressed A/V signal into an original signal through a video decoding algorithm and an audio decoding algorithm, and outputs the decoded A/V signal so that the decoded A/V signal can be displayed.

Meanwhile, a second tuner 105 tunes to a specific channel frequency of a data broadcast program transmitted through a cable in the DSG mode and outputs the tuned specific channel frequency to a second demodulation unit 106. The second demodulation unit 106 demodulates the data broadcast program transmitted in the DSG mode and outputs the demodulated data broadcast program to a central processing unit (CPU) 110.

Also, a third tuner 107 tunes a specific channel frequency of a data broadcast program transmitted through a cable in the OOB mode and outputs the tuned specific channel frequency to a third demodulation unit 111. The third demodulation unit 111 demodulates the data broadcast program transmitted in the OOB mode using Quadrature Phase Shift Keying (QPSK) and outputs the demodulated data broadcast program to the cablecard 200. In the OOB, a QPSK transmission mode is used. At the reception side, therefore, demodulation is performed in a QPSK mode.

In a case in which bidirectional transmission is possible between the cable broadcast station and the cable broadcast program receiver, information (for example, request for paid programming, diagnostic information of the host, etc.) transmitted from the cable broadcast program receiver to the cable broadcast station is transmitted in the OOB mode or the DSG mode. To this end, a switching unit 108 may be provided. That is, in the OOB mode, user information or system diagnostic information is output to a modulation unit 109 through the cablecard 200 and the switching unit 108, is modulated by the modulation unit 109 using QPSK, and is transmitted to the cable broadcast station through the cable.

Also, in the DSG mode, such information is output to the modulation unit 109 through the CPU 110 and the switching unit 108, is modulated by the modulation unit 109 using Quadrature Amplitude Modulation-16 (QAM-16), and is transmitted to the cable broadcast station through the cable.

An interface may be provided between the CPU 110 and the cablecard 200. The CPU 110 and the cablecard 200 may communicate with each other through the interface according to a predetermined protocol.

For example, the CPU 110 parses the diagnostic request Diagnostic_req APDU transmitted from the cablecard 200 to determine whether diagnostic ID to request diagnostics with respect to the DiiVA connection status is contained in the Diagnostic ID.

Upon determining that diagnostic ID to request diagnostics with respect to the DiiVA connection status is contained in the Diagnostic ID, the host 100 confirms the DiiVA link status through a DiiVA controller 120, and creates and transmits the result to the cablecard 200.

First, the DiiVA controller 120 determines whether there are peripheral devices connected to the host through the DiiVA link and confirms the number of the connected peripheral devices. Subsequently, the DiiVA controller 120 transmits Diagnostic_cnf APDU containing the DiiVA Status report having the information illustrated in FIG. 5 to the cablecard 200.

As illustrated in FIG. 5, the DiiVA Status report may include device_type, device_version, connection_status, host_HDCP_status, device_HDCP_status, video format information, and audio format information.

The cablecard 200 transmits host diagnostic status information created whenever a 'for' loop is executed as illustrated in FIGS. 3 and 4 in a state in which the host diagnostic status information is contained in Diagnostic_cnf APDU.

Figure 9:
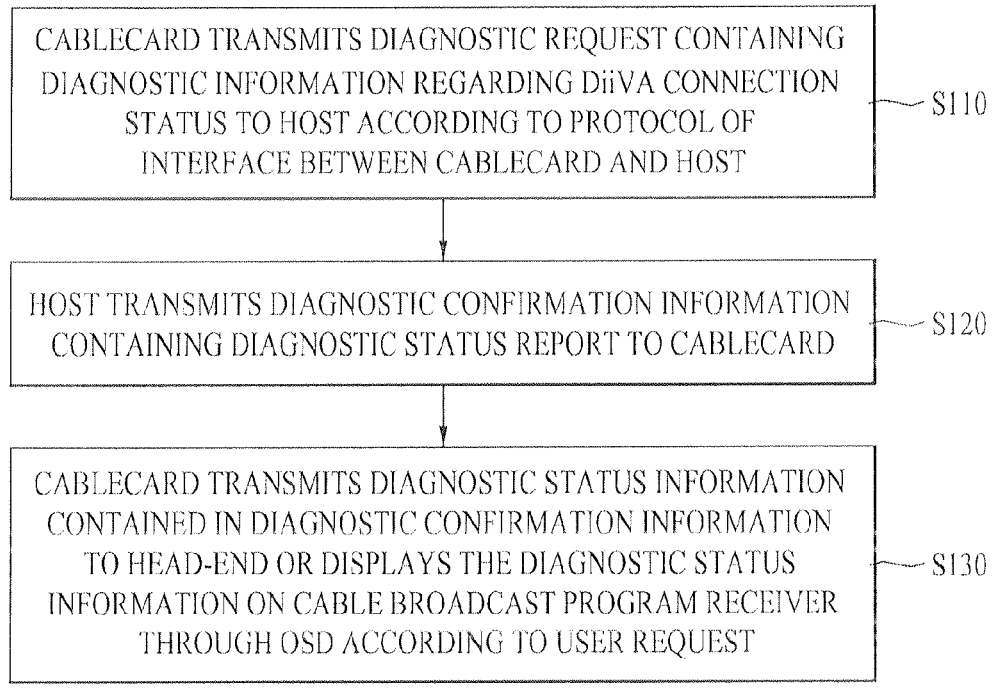
FIG. 9 is a view illustrating an embodiment of a diagnostic method of a cable broadcast program receiver.

FIG. 9 illustrates an embodiment of a diagnostic method of the cable broadcast program receiver.

The cablecard transmits a diagnostic request containing diagnostic information regarding the DiiVA connection status to the host according to a protocol of an interface between the cablecard and the host (S110).

The interface between the cablecard and the host may include a CPU interface as an example of an interface between the CPU of the host and the cablecard. A Generic Diagnostic Protocol as previously illustrated may be used as the protocol of the interface.

The host receives and parses the diagnostic request containing the diagnostic information regarding the DiiVA connection status requested by the cablecard according to the Generic Diagnostic Protocol.

The host may confirm diagnostic items using a diagnostic ID from the parsed diagnostic request to determine whether the DiiVA connection status is contained in the diagnostic items. Subsequently, the host creates diagnostic confirmation information according to the diagnostic ID from the parsed diagnostic request. In this case, the diagnostic confirmation information may include a diagnostic status report. The diagnostic status report is illustrated in FIG. 5.

The host transmits the diagnostic confirmation information containing the diagnostic status report to the cablecard (S120).

The cablecard transmits diagnostic status information contained in the diagnostic confirmation information to a headend or displays the diagnostic status information on the cable broadcast program receiver through OSD according to user request (S130).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A cable broadcast program receiver comprising:
    a cablecard to transmit a diagnostic request containing diagnostic information regarding digital interactive interface for video and audio (DiiVA) connection status to a host device according to a protocol of an interface between the cablecard and the host device; and
    the host device to receive the diagnostic request, and to transmit diagnostic confirmation information containing a diagnostic status report regarding the DiiVA connection status to the cablecard according to the protocol of the interface between the cablecard and the host device in response to the diagnostic request,
    wherein the diagnostic status report regarding the DiiVA connection status contains first information indicating a DiiVA device version and second information indicating a current video format utilized on a DiiVA link,
    wherein the second information contains a color depth field indicating a color depth on the DiiVA link, and
    wherein a value of the color depth field describes one of 24 bits per pixel, 30 bits per pixel or 36 bits per pixel.

2. The cable broadcast program receiver according to claim 1, wherein the diagnostic confirmation information contains a diagnostic identifier regarding the DiiVA connection status.

3. The cable broadcast program receiver according to claim 1, wherein the diagnostic status report regarding the DiiVA connection status contains information indicating whether a device connected to the host device uses a digital visual interface (DVI), high definition multimedia interface (HDMI), or DiiVA.

4. The cable broadcast program receiver according to claim 1, wherein the diagnostic status report regarding the DiiVA connection status contains information indicating a DiiVA device connected to the host device.

5. The cable broadcast program receiver according to claim 1, wherein the diagnostic status report regarding the DiiVA connection status contains information indicating whether High-bandwidth Digital Content Protection (HDCP) is enabled on a DiiVA link.

6. The cable broadcast program receiver according to claim 1, wherein the diagnostic status report regarding the DiiVA connection status contains information indicating HDCP status of a device connected to the host device.

7. The cable broadcast program receiver according to claim 1, wherein the diagnostic status report regarding the DiiVA connection status contains information indicating a current audio format utilized on a DiiVA link.

8. A diagnostic method of a cable broadcast program receiver, comprising:
    transmitting, at a cablecard, a diagnostic request containing diagnostic information regarding DiiVA connection status to a host device according to a protocol of an interface between the cablecard and the host device; and
    receiving, at the host device, the diagnostic request and transmitting diagnostic confirmation information containing a diagnostic status report regarding the DiiVA connection status to the cablecard according to the protocol of the interface between the cablecard and the host device in response to the diagnostic request,
    wherein the diagnostic status report regarding the DiiVA connection status contains first information indicating a DiiVA device version and second information indicating a current video format utilized on a DiiVA link,
    wherein the second information contains a color depth field indicating a color depth on the DiiVA link, and
    wherein a value of the color depth field describes one of 24 bits per pixel, 30 bits per pixel or 36 bits per pixel.

9. The diagnostic method according to claim 8, wherein the diagnostic confirmation information contains a diagnostic identifier regarding the DiiVA connection status.

10. The diagnostic method according to claim 8, wherein the diagnostic status report regarding the DiiVA connection status contains information indicating whether a device connected to the host device uses DVI, HDMI, or DiiVA.

11. The diagnostic method according to claim 8, wherein the diagnostic status report regarding the DiiVA connection status contains information indicating a DiiVA device connected to the host device.

12. The diagnostic method according to claim 8, wherein the diagnostic status report regarding the DiiVA connection status contains information indicating whether HDCP is enabled on a DiiVA link.

13. The diagnostic method according to claim 8, wherein the diagnostic status report regarding the DiiVA connection status contains information indicating HDCP status of a device connected to the host device.

14. The diagnostic method according to claim 8, wherein the diagnostic status report regarding the DiiVA connection status contains information indicating a current audio format utilized on a DiiVA link.

* * * * *